United States Patent
Teoh et al.

(10) Patent No.: US 8,094,937 B2
(45) Date of Patent: Jan. 10, 2012

(54) SYSTEM AND METHOD FOR LABELING FEATURE CLUSTERS IN FRAMES OF IMAGE DATA FOR OPTICAL NAVIGATION

(75) Inventors: Edward Kah Ching Teoh, Selangor (MY); Zi Hao Tan, Kelantan (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 1036 days.

(21) Appl. No.: 11/736,072

(22) Filed: Apr. 17, 2007

(65) Prior Publication Data

US 2008/0260249 A1    Oct. 23, 2008

(51) Int. Cl.
*G06K 9/34* (2006.01)

(52) U.S. Cl. .......... 382/180; 382/103; 382/153; 342/62; 342/63; 342/65; 342/160; 342/161; 348/113; 348/116; 348/117; 348/118; 348/119

(58) Field of Classification Search ............ 382/103, 382/153, 180; 342/62–66, 160–169; 348/113, 348/116–119; 701/28; 702/92–95; 244/3.15–3.16, 244/3.19

See application file for complete search history.

(56) References Cited

U.S. PATENT DOCUMENTS

| | | | | |
|---|---|---|---|---|
| 4,754,402 A | * | 6/1988 | Wand | 701/28 |
| 4,887,223 A | * | 12/1989 | Christian | 382/153 |
| 5,657,251 A | * | 8/1997 | Fiala | 342/162 |
| 5,734,736 A | * | 3/1998 | Palmer et al. | 382/103 |
| 6,419,185 B1 | * | 7/2002 | Hagelin et al. | 244/3.15 |
| 2001/0056326 A1 | * | 12/2001 | Kimura | 701/208 |
| 2004/0202363 A1 | | 10/2004 | Cowperthwaite et al. | |
| 2005/0060088 A1 | * | 3/2005 | Helal et al. | 701/208 |
| 2008/0109158 A1 | * | 5/2008 | Huhtala et al. | 701/208 |

FOREIGN PATENT DOCUMENTS

| | | |
|---|---|---|
| JP | 2278479 | 11/1990 |
| JP | 6076062 | 3/1994 |
| JP | 200358317 | 2/2003 |
| JP | 2003067754 | 3/2003 |

* cited by examiner

*Primary Examiner* — Brian Q Le
*Assistant Examiner* — Mek Bekele

(57) ABSTRACT

A system and method for labeling feature clusters in frames of image data for optical navigation uses distances between feature clusters in a current frame of image data and feature clusters in a previous frame of image data to label the feature clusters in the current frame of image data using identifiers associated with the feature cluster in the previous frame of image data that have been correlated with the feature clusters in the current frame of image data.

19 Claims, 8 Drawing Sheets

SYSTEM AND METHOD FOR LABELING FEATURE CLUSTERS IN FRAMES OF IMAGE DATA FOR OPTICAL NAVIGATION

BACKGROUND OF THE INVENTION

In typical systems for optical navigation, frames of image data are sequentially captured and compared to track displacements of features in the frames relative to the optical navigation system. These relative displacements of the features in the frames can be used to estimate the motion of the features relative to the optical navigation system or the motion of the optical navigation system relative to the features. In some applications, these features may be beacons (e.g., infrared sources) that are captured and used as reference points for optical navigation. This type of optical navigation technique will be referred to herein as a beacon-based navigation technique. Beacon-based navigation techniques are currently used in computer gaming systems to track motion of remote control devices for the gaming systems.

In a beacon-based navigation technique, the imaged beacons or beacon clusters in the captured frames of image data are identified as feature clusters and labeled in order to estimate any displacement of the beacon clusters between the captured frames. The beacon sources are usually stationary, and thus, serve as reference points to determine the relative motion of the optical navigation system. In a conventional process for identifying beacon clusters in a captured frame of image data, each pixel of the image frame is examined to determine whether that pixel belongs to a beacon cluster. During this process, each beacon cluster is labeled with a number to differentiate the different beacon clusters. However, these label numbers of the beacon clusters may not be consistent between different frames of image data due to the displacement of the beacon clusters from one frame of image data to the next. Thus, the same beacon cluster may not be labeled with the same number in different frames of image data, which will result in errors in calculating the relative position of the optical navigation system.

Thus, there is a need for a system and method for identifying and labeling beacon clusters in captured frames of image data such that the same beacon clusters are more consistently labeled with the same identifiers, e.g., numbers, in different frames of image data.

SUMMARY OF THE INVENTION

A system and method for labeling feature clusters in frames of image data for optical navigation uses distances between feature clusters in a current frame of image data and feature clusters in a previous frame of image data to label the feature clusters in the current frame of image data using identifiers associated the feature cluster in the previous frame of image data that have been correlated with the feature clusters in the current frame of image data. The system and method allows the same feature clusters in the current and previous frames of image data to be identified and used for optical navigation.

A method for labeling feature clusters in frames of image data for optical navigation in accordance with an embodiment of the invention comprises identifying current feature clusters in a current frame of image data, correlating the current feature clusters in the current frame of image data with previous feature clusters in a previous frame of image data based on distances between the current and previous feature clusters, and labeling each of the current feature clusters with an identifier associated with one of the previous feature clusters that has been correlated with that current feature cluster.

A method for labeling feature clusters in frames of image data for optical navigation in accordance with another embodiment of the invention comprises identifying current feature clusters in a current frame of image data, correlating the current feature clusters in the current frame of image data with previous feature clusters in a previous frame of image data based on distances between the current and previous feature clusters, including associating each current feature cluster of the current feature clusters with one of the previous feature clusters that is closest to that current feature cluster and correlating a particular current feature cluster of the current feature clusters with an associated previous feature cluster of the previous feature clusters in which a distance between the particular current feature cluster and the associated previous feature cluster is the longest distance between any associated current and previous feature clusters, and labeling each of the current feature clusters with an identifier associated with one of the previous feature clusters that has been correlated with that current feature cluster.

A system for optical navigation in accordance with an embodiment of the invention comprises an image sensor and a navigation engine. The image sensor is configured to capture frames of image data. The navigation engine is operatively connected to the image sensor. The navigation engine is configured to identify current feature clusters in a current frame of image data and correlate the current feature clusters in the current frame of image data with previous feature clusters in a previous frame of image data based on distances between the current and previous feature clusters. The navigation engine is further configured to label each of the current feature clusters with an identifier associated with one of the previous feature clusters that has been correlated with that current feature cluster.

Other aspects and advantages of the present invention will become apparent from the following detailed description, taken in conjunction with the accompanying drawings, illustrated by way of example of the principles of the invention.

DETAILED DESCRIPTION

Figure 1:
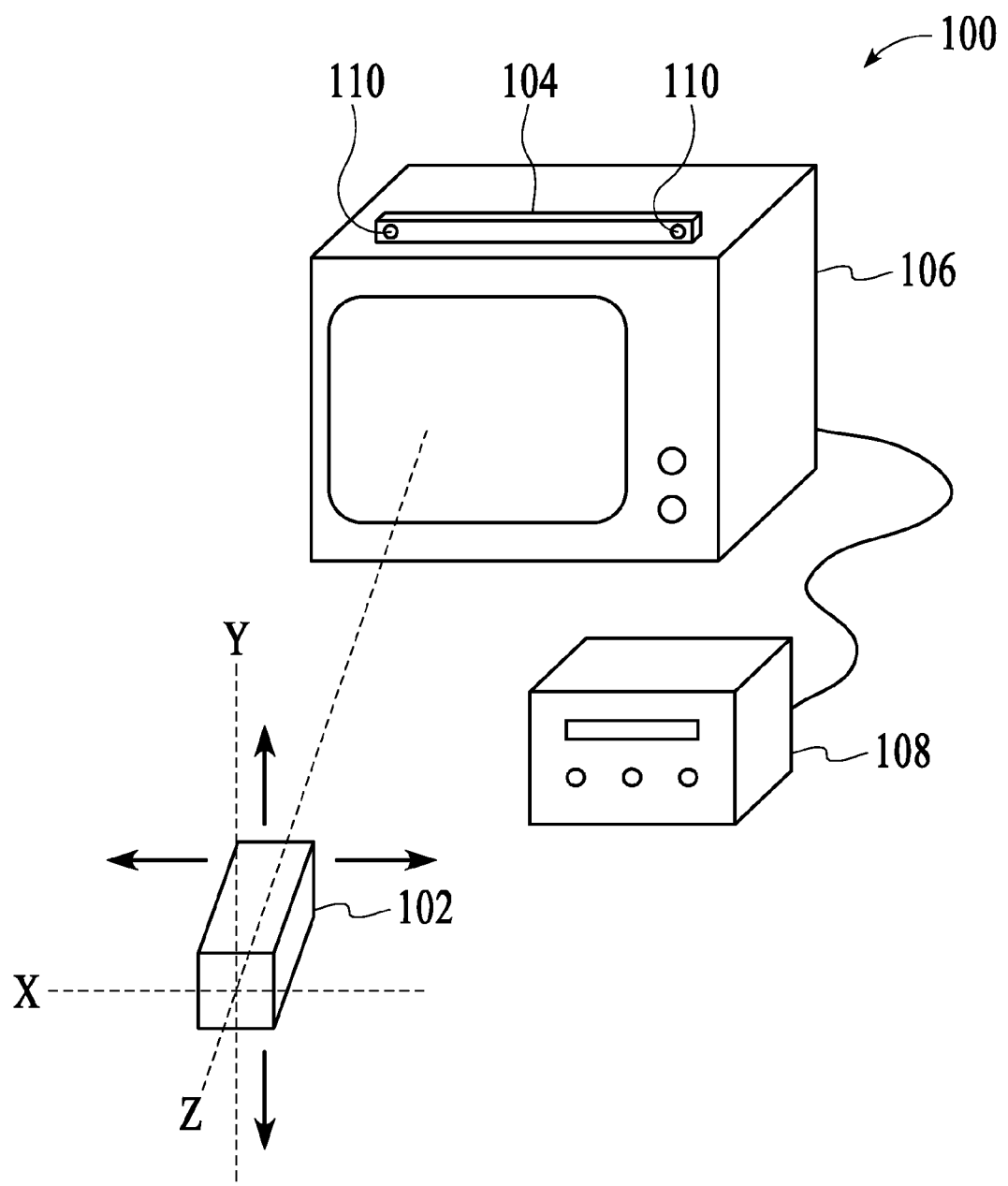
FIG. 1 shows an optical navigation system in accordance with an embodiment of the invention.

With reference to FIG. 1, an optical navigation system 100 in accordance with an embodiment of the invention is described. In this embodiment, the optical navigation system 100 operates to navigate using imaged beacons in captured frames of image data. That is, the optical navigation system 100 uses a beacon-based navigation technique for optical navigation. Thus, in operation, the optical navigation system 100 processes the captured frames of image data in order to identify and label feature clusters in the captured frames that are imaged beacon sources. These feature clusters are sometimes referred to herein as beacon clusters or simply clusters. As described in more detail below, the optical navigation system 100 labels the feature clusters in the captured frames of image data such that the same feature clusters are more consistently labeled with the same identifiers, e.g., numbers, letters, symbols or any combination thereof, for different frames of image data.

As shown in FIG. 1, the optical navigation system 100 includes a controller unit 102, a beacon unit 104, a display device 106 and a console unit 108. In some embodiments, the console unit 108 is coupled to the display device 106 using conventional wiring. Alternatively, other wired or wireless connections may be implemented. In some embodiments, the controller unit 102 and the console unit 108 are part of a gaming system. Alternatively, the optical navigation system 100 may be used to implement other types of systems. For example, some embodiments of the optical navigation system 100 may be used to provide an accessible user interface for a computer system.

The controller unit 102 is configured to calculate the relative position of the controller unit with respect to the beacon unit 104. The controller unit 102 is designed to perform the positional calculation using the beacon unit 104 as a reference. The beacon unit 104 includes multiple beacon light sources 110, which are used as reference points by the controller unit 102 to calculate the relative position of the controller unit. In an embodiment, the beacon light sources 110 of the beacon unit 104 are infrared (IR) or visible light sources, such as light-emitting diodes (LEDs), laser diodes, etc. In the illustrated embodiment, the beacon unit 104 includes two beacon light sources 110. However, in other embodiments, the beacon unit 104 may include more than two beacon light sources. The controller unit 102 operates to electronically capture the beacon light sources 110 of the beacon unit 104 in frames of image data. The controller unit 102 then processes the captured frames of image data to identify and label the imaged beacon light sources in the captured frames. Changes in the position of the imaged beacon light sources between the captured frames of image data are used to output position data, which indicates the relative position of the controller unit 102 within the coordinate system of the optical navigation system 100. The coordinate system of the optical navigation system 100 may be established during a calibration stage. The output position data may be x, y and z position values along the X, Y and Z axes of the optical navigation system. Alternatively, the output position data may be $\Delta x$, $\Delta y$ and $\Delta z$ values along the X, Y and Z axes of the optical navigation system 100, which represent changes or displacements along the respective axes.

The position data of the controller unit 102 is transmitted to the console unit 108. The console unit 108 processes the position data for use in a particular application. As an example, the console unit 108 may be configured to manipulate a graphical element displayed on the display device 106 according to the movements of the controller unit 102 as new position data is received from the controller unit. The console unit 108 may be a computer system, which runs one or more computer programs, such as gaming programs. In this embodiment, the console unit 108 may include components commonly found in a personal computer system.

Figure 2:
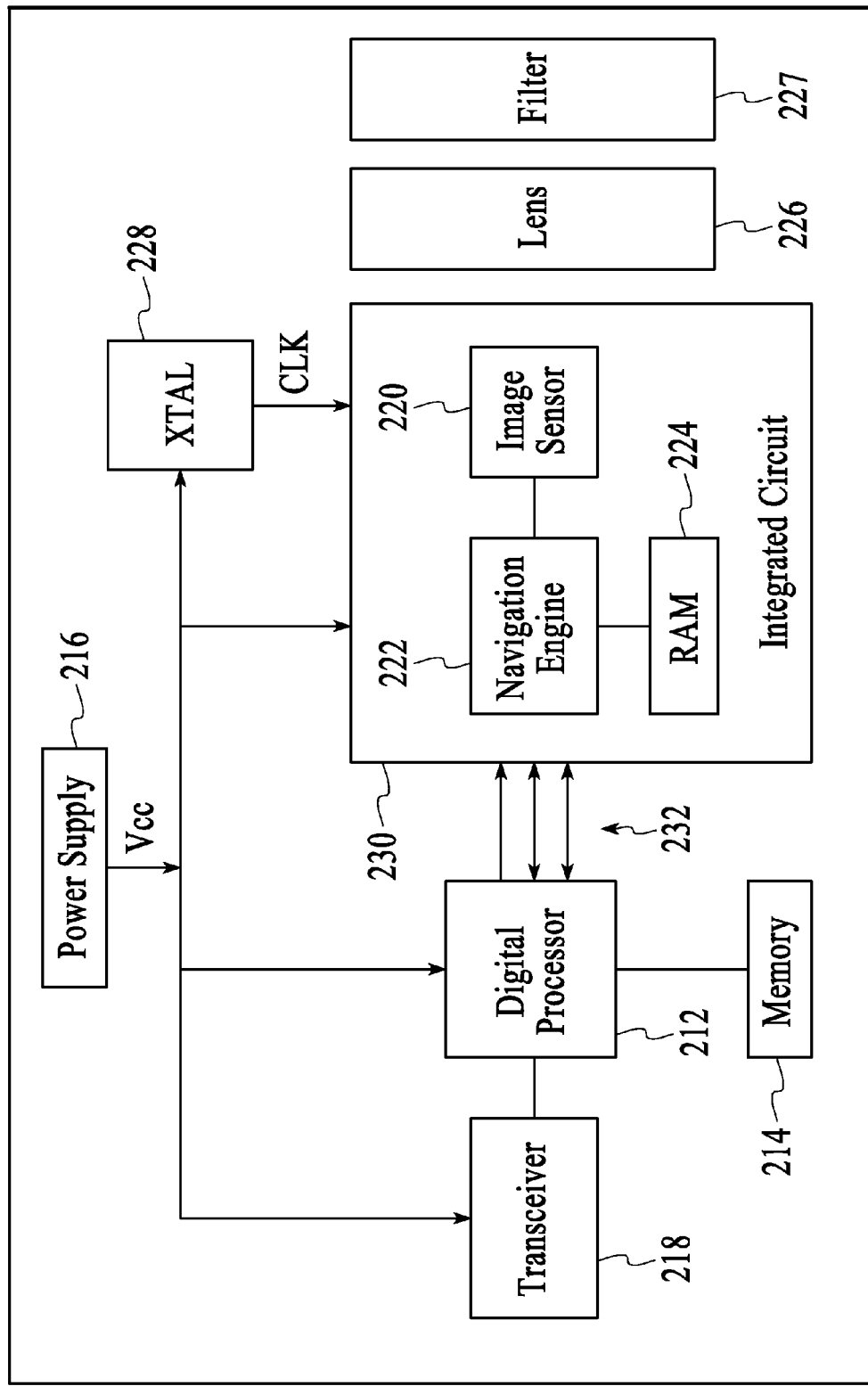
FIG. 2 is a block diagram of a controller unit included in the optical navigation system of FIG. 1.

Turning now to FIG. 2, a block diagram of the controller unit 102 in accordance with an embodiment of the invention is shown. The illustrated controller unit 102 includes a digital processor 212, a memory device 214, a power supply 216, a transceiver 218, an image sensor 220, a navigation engine 222, a random access memory 225, an optical lens 226, and optical filter 227 and a crystal oscillator 228. In the illustrated embodiment, the image sensor 220, the navigation engine 222 and the RAM 224 are part of an integrated circuit (IC) 230. However, in other embodiments, the image sensor 220, the navigation engine 222 and the RAM 224 may be implemented as separate components. The IC 230 is connected to the digital processor 212 via one or more signal lines 232, which may include address, data and/or control signal lines. Although the controller unit 102 is shown to include certain components, the controller unit may include additional components. For example, some embodiments of the controller unit 102 include input buttons, joysticks or other selectors typically used for gaming controllers. Other embodiments of the controller unit 102 include feedback signal generators to generate a tactile or auditory feedback signal to a user.

In some embodiments, the digital processor 212 may be a general-purpose processor such as a microprocessor or microcontroller. In other embodiments, the digital processor 212 may be a special-purpose processor such as a digital signal processor. In other embodiments, the digital processor 212 may be another type of controller or a field programmable gate array (FPGA). In general, the digital processor 212 implements operations and functions of the controller unit 102.

The memory device 214 is configured to store data and/or instructions for use in the operation of the controller unit 102. In some embodiments, the memory device 214 stores instructions, which when executed by the digital processor 212, cause the digital processor to perform certain operations. Similarly, some instructions may be stored in memory integrated into the digital processor 212. Additionally, the memory device 214 may store position data produced by the digital processor 212 and/or the navigation engine 222.

In an embodiment, the power supply 216 provides direct current (DC) electrical signal, Vcc, to the digital processor 212, as well as other components of the controller unit 102. Some embodiments of the power supply 216 include one or more batteries. In some embodiments, the power supply 216 receives power from the console unit 108 via a wire. In a similar manner, the crystal oscillator 228 provides a clock signal, CLK, to one or more of the components of the controller unit 102.

The transceiver 218, which is coupled to the digital processor 212, is configured to transmit signals such as position data signals from the controller unit 102 to the console unit 108. The transceiver 218 is also configured to receive control signals, or feedback signals, from the console unit 108. Additionally, the transceiver may facilitate wired or wireless communications. For example, the transceiver 218 may send electrical signals via a hard-wired connection to the console unit 108. Alternatively, the transceiver 218 may send wireless signals, such as radio frequency (RF) signals, using known wireless data transmission protocols.

The image sensor 220, which is also coupled to the digital processor 212, is configured to capture frames of image data. The image sensor 220 includes an electronic imaging sensor array, such as a complimentary metal-oxide-semiconductor (CMOS) image sensor array or a charge-coupled device (CCD) image sensor array. For example, the image sensor 220 may include a 30×30 pixel array to capture frames of image data with a relatively low resolution. However, other embodiments of the image sensor 220 may include an increased pixel array size for higher resolution frames of image data or a decreased pixel array size for lower resolution frames of image data. In the depicted embodiment, the image sensor 220 is used in conjunction with the optical lens 226 and the optical filter 227. The optical lens 226 is used to focus an image onto the image sensor 220. The optical filter 227 is used to selectively filter out undesired light and to selectively transmit the light from the beacon light sources 110 of the beacon unit 104 and so that the light from the beacon light sources 110 can be imaged by the image sensor 220. As an example, the optical filter 227 may be an IR or color filter. However, other embodiments may omit the optical lens 226 and/or the optical filter 227, or implement multiple optical lenses and/or optical filters.

In the illustrated embodiment, the navigation engine 222 is integrated with the image sensor 220 and the RAM 224 on the IC 230. In other embodiments, the navigation engine 222 may be partially or wholly integrated with the digital processor 212. In general, the navigation engine 222 processes frames of image data captured by the image sensor 220 to compute and output current position data with respect to the controller unit 102. During this process, the navigation engine 222 performs an operation that includes identification and provisional labeling of feature clusters in the captured frames of image data, e.g., imaged beacon light sources in the captured frames. The navigation engine 222 then relabels the feature clusters to ensure that the same feature clusters in the current and previous frames of image data are labeled with the same identifiers. Once the feature clusters in the captured frames are identified and labeled, these clusters are used to compute the position data of the controller unit.

Figures 3, 5:
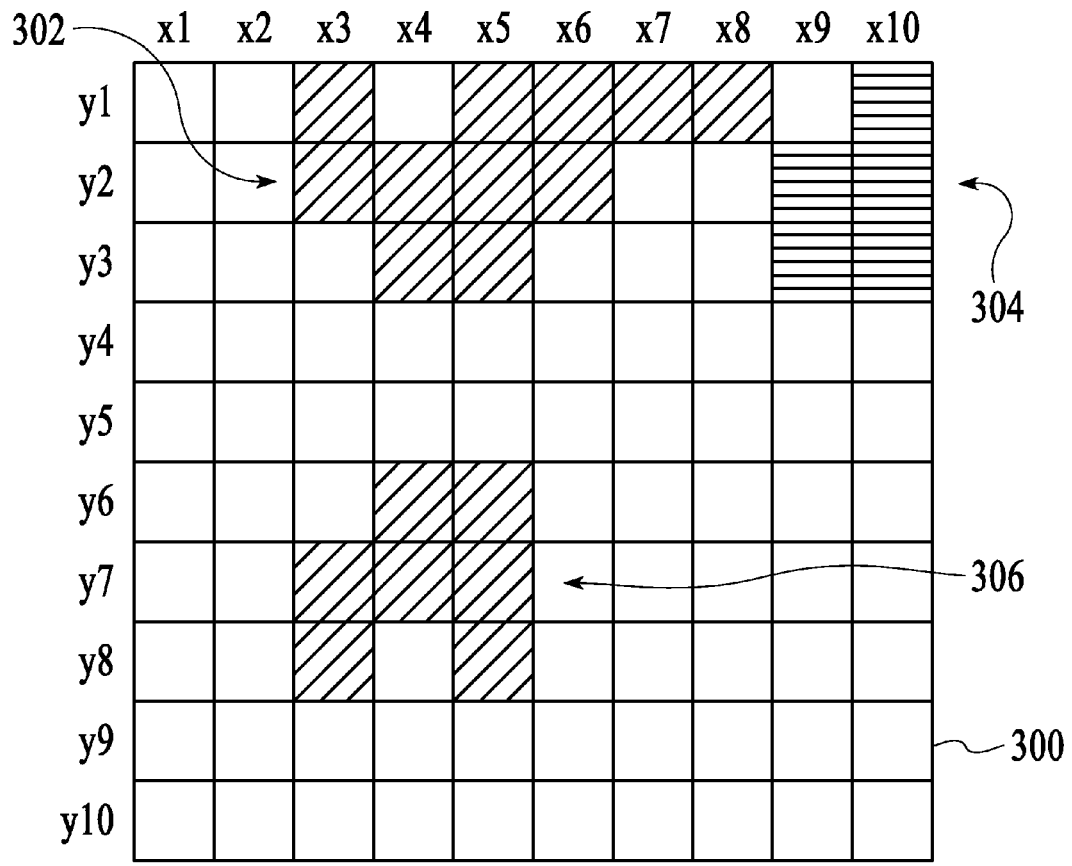
FIG. 3 shows a 10×10 sensor array that includes a frame of image data with three feature clusters.
FIG. 5 shows the neighboring pixels of a current pixel, which are examined and/or processed in order to provisionally label the current pixel as belonging to a feature cluster in accordance with an embodiment of the invention.

The operation of the navigation engine 222 with respect to identification and provisional labeling of feature clusters in accordance with an embodiment of the invention is described with reference to a 10×10 sensor array 300 of FIG. 3 as an example and a process flow diagram of FIG. 4. In FIG. 3, the sensor array 300 includes captured data in each of the pixels. In an embodiment, each data in a pixel of the sensor array 300 is a luminance or intensity value captured in that pixel. Thus, in this example, the captured frame of image data is a 10×10 pixel image frame. As shown in FIG. 3, the captured frame includes three feature clusters 302, 304 and 306, which may represent imaged beacon sources. In an embodiment, a pixel of a frame of image data is considered to belong to a feature cluster if that pixel has a luminance value greater than a predefined threshold value. As explained in more detail below, the navigation engine 222 first identifies a pixel as belonging to a feature cluster and then labels that pixel into the proper feature cluster, assuming that there is more than one feature cluster. In addition, the navigation engine 222 performs parameter calculation of each feature cluster as the pixels of the image frame are processed.

Figure 4:
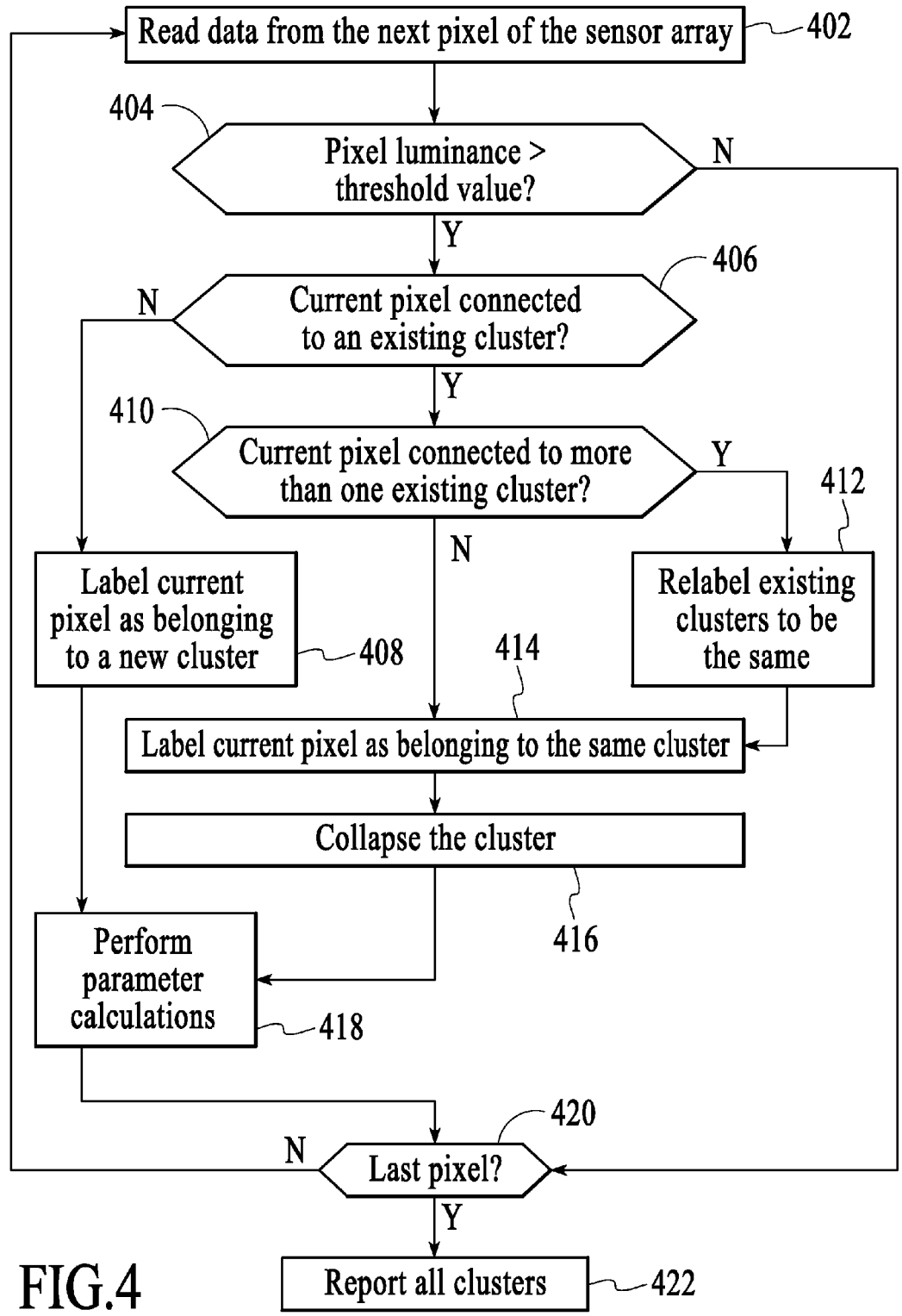
FIG. 4 is a process flow diagram of an operation of a navigation engine included in the optical navigation system of FIG. 1 in accordance with an embodiment of the invention.
Figure 6A:
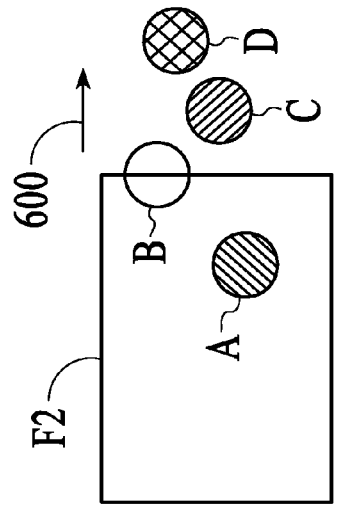
FIGS. 6A-6D show feature clusters in different frames of image data to illustrate a relabeling process in accordance with an embodiment of the invention.
Figure 6B:
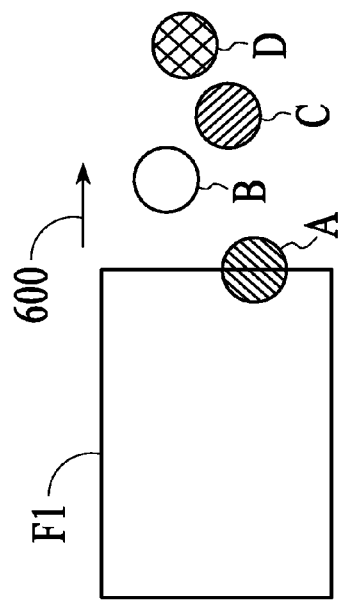
Figure 6C:
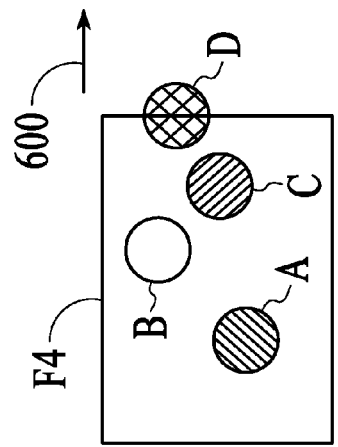
Figure 6D:
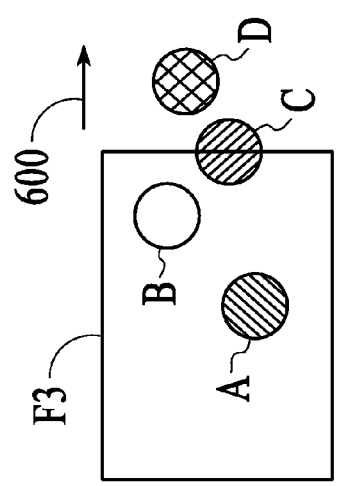

As shown in FIG. 4, the operation of the navigation engine 222 begins at block 402, where data from the next pixel of the sensor array 304 of FIG. 3 is read. The pixel from which the pixel data is read is the current pixel of the sensor array 304 being processed by the navigation engine 222. The pixel data includes at least the luminance value of the current pixel. The pixel data is read from the sensor array 300 from left to right beginning from the top row down to the bottom row. Thus, the first pixel data to be read is the data from the pixel (x1, y1) shown in FIG. 3.

Next, at block 404, a determination is made whether the pixel luminance value of the current pixel is greater than a threshold value. The pixels with the luminance value greater than the threshold value are considered "cluster pixels" or pixels that belong to one or more features clusters. If the pixel luminance value is not greater than the threshold value, then the operation proceeds to block 420. If the pixel luminance value is greater than the threshold value, then the operation proceeds to block 406.

At block 406, a determination is made whether the current pixel is connected to an existing feature cluster. This determination is made by examining label information associated with neighboring pixels about the current pixel. The neighboring pixels about the current pixel are pixels that are immediately next to the current pixel. In some embodiments, only selected neighboring pixels of the current pixel are examined to determine if the current pixel is connected to an existing feature cluster. In an embodiment, only the neighboring pixels that are above the current pixel and the neighboring pixel to the immediate left of the current pixels are examined. This is illustrated in FIG. 5, which shows a current pixel and the neighboring pixels [1], [2], [3] and [4]. In this embodiment, only the immediate left neighboring pixel [1], the upper left neighboring pixel [2], the immediate upper neighboring pixel [3] and the upper right neighboring pixel [4] are examined in order to determine whether the current pixel is connected to an existing feature cluster. Consequently, the navigation engine 222 needs to store cluster information regarding the neighboring pixels [1], [2], [3] and [4] for the current pixel. Thus, for each pixel being processed, cluster information for similarly positioned neighboring pixels with respect to that pixel needs to be stored and accessed.

Turning back to FIG. 4, if it is determined at block 406 that the current pixel is not connected to an existing feature cluster, the operation proceeds to block 408, where the current pixel is labeled as belonging to a new feature cluster. The operation then proceeds to block 418. However, if it is determined at block 406 that the current pixel is connected to an existing feature cluster, the operation proceeds to block 410, where a determination is made whether the current pixel is connected to more than one feature cluster. That is, a determination is made whether two or more of the neighboring pixels belong to different feature clusters. If the current pixel is connected to only one feature cluster, then the operation proceeds to block 414. If the current pixel is connected to more than one feature cluster, then the different feature clusters of the neighboring pixels, as well as other selected previously processed pixels, are relabeled as the same feature cluster, at block 412. That is, the neighboring pixels and other selected previously processed pixels that have been labeled as belonging to the different feature clusters are relabeled as belonging to the same feature cluster. In an embodiment, only the neighboring pixels that are above the current pixel and the neighboring pixel to the immediate left of the current pixel, and two nearby pixels that are to the right of the upper right neighboring pixel are relabeled, if appropriate. This is illustrated in FIG. 5, which shows the current pixel, the neighboring pixels [1], [2], [3] and [4], and the nearby pixels [5] and [6]. In an embodiment, the different feature clusters are relabeled as the earliest existing feature cluster used to label the neighboring pixels. The operation then proceeds to block 414.

At block 414, the current pixel is labeled as belonging to the same existing feature cluster. If the current pixel is connected to only a single existing feature cluster, then the current pixel is labeled as belonging to that existing feature cluster. If the current pixel is connected to more than one existing feature cluster, then the current pixel is labeled as belonging to the relabeled feature cluster.

Next, at block 416, the existing feature cluster of the current pixel is collapsed. Next, at block 418, parameter calculations are performed for the feature cluster of the current pixel. In an embodiment, the parameter calculation includes total_x value, total_y value, pixel_count value, boundary_x1 value, boundary_y1 value, boundary_x2 value and boundary_y2 value. The total_x value is the sum of x coordinate values of the pixels that belong to the feature cluster. The total_y value is the sum of y coordinate values of the pixels that belong to the feature cluster. The pixel_count value is the number of pixels that belong to the feature cluster. The boundary_x1 value, boundary_y1 value, boundary_x2 value and boundary_y2 values are the rectangular boundary values for the feature cluster, which include the smallest x and y coordinate values, i.e., the boundary_x1 and boundary_y1 values, and the largest x and y coordinate values, i.e., the boundary_y2 and boundary_y2 values, of the pixels that belong to the feature cluster.

Next, at block 420, a determination is made whether the current pixel is the last pixel in the sensor array 304. If the current pixel is not the last pixel, then the operation proceeds back to block 402, where the next pixel is read from the sensor array to be processed. If the current pixel is the last pixel, then the operation proceeds to block 422, where all the feature clusters are reported in order to perform navigation.

During this process, the coordinates of the centroid of each feature cluster are computed. The centroid coordinates of the feature clusters may be computed as part of the parameter calculations. Alternatively, the centroid coordinates of the feature clusters may be computed independently after the pixels of the frame of image data have been processed. The computed centroid coordinates may be stored in the memory device 214, the RAM 224 or the internal memory of the digital processor 212.

After the feature clusters are identified and provisionally labeled, the feature clusters are relabeled by the navigation engine 222 so that the feature clusters in the current frame of image data are labeled with the identifiers associated with the same feature clusters in the previous feature clusters. As described herein, in some embodiments, the identifiers used for relabeling are the identifiers used for the feature clusters in the previous feature clusters. However, in other embodiments, the identifiers used for relabeling may be other identifiers that correspond to the feature clusters in the previous feature clusters. In some embodiments, the distances between the feature clusters in the current frame of image data and the feature clusters in the previous frame of image data are used to correlate the feature clusters in the current and previous frames of image data. The distance between a feature cluster in the current frame and a feature cluster in the previous frame can be considered to be the distance between the two feature clusters if the current and previous frames are superimposed so that the two feature clusters are on the same frame. For the correlated feature clusters, the identifiers of the correlated feature clusters in the previous frame of image data are used to relabel the correlated feature clusters. Any remaining feature clusters in the current frame of image data are relabeled using identifiers not used in the previous frame of image data. In certain situations, a remaining feature cluster in the current frame of image data may be relabeled with the provisional identifier of that feature cluster.

In an embodiment, a feature cluster in the current frame of image data is correlated with the nearest feature cluster in the previous frame of image data by the navigation engine 222 to relabel the feature cluster using the identifier of the correlated feature cluster in the previous frame. The nearest feature cluster may be found by looking at the distances between the centroid of the feature cluster in the current frame of image data and the centroids of the feature clusters in the previous frame of image data to determine the shortest distance. The identifier of the nearest feature cluster in the previous frame of image data is then used as the identifier for the correlated feature cluster in the current frame of image data. Once a particular feature cluster in the previous frame has been used as the nearest feature cluster for a particular feature cluster in the current frame, those particular feature clusters are not considered to relabel any other feature cluster in the current frame. In this fashion, each feature cluster in the current frame of image data can be correlated with the nearest feature cluster in the previous frame of image data and relabeled using the identifier of that nearest feature cluster.

In some implementations, the feature cluster in the current frame with the nearest feature cluster in the previous frame is relabeled first. The feature cluster in the current frame with the second nearest feature cluster in the previous frame is then relabeled. Any remaining feature clusters in the current frame are sequentially relabeled in the same manner. In other implementations, the feature clusters in the current frame are processed in a predefined order. As an example, the feature clusters in the current frame may be relabeled in a sequence determined by the provisional identifiers of the feature clusters. In this example, the feature cluster in the current frame that has been provisionally labeled using the identifier "1" may be relabeled first, followed by the feature cluster that has been provisionally labeled using the identifier "2". Any remaining feature clusters in the current frame are sequentially relabeled in the same manner.

The process of relabeling feature clusters in a current frame of image data using the nearest feature clusters in a previous frame of image data in accordance with an embodiment of the invention is illustrated using FIGS. 6A-6D as an example. In this example, there are four beacon light sources A, B, C and D, which can be captured in frames of image data, such as image frames F1, F2, F3 and F4. In this example, the image frames F1, F2, F3 and F4 are successively captured as the image sensor 220 of the controller unit 102 is displaced in a positive X direction, as indicated by an arrow 600, with respect to the beacon light sources A, B, C and D.

In the frame F1, only a portion of the beacon light source A is captured as a feature cluster A. As the pixels of the frame F1 are processed, the feature cluster A is provisionally labeled as "1". Assuming that there were no feature clusters in the previous image frame, the feature cluster A is relabeled using the same identifier "1".

In the frame F2, the entire beacon light source A is captured as the feature cluster A and a portion of the beacon light source B is captured as a feature cluster B. As the pixels of the frame F2 are processed, the feature cluster A is provisionally labeled as "2" and the feature cluster B is provisionally labeled as "1". However, since the feature cluster A in the current frame F2 is nearest to the feature cluster A in the previous frame F1, the feature cluster A in the current frame F2 is relabeled as "1", which is the same identifier of the feature cluster A in the previous frame F1. In this example, since there are two feature clusters A and B in the current frame F2, the identifiers "1" and "2" are used to label the feature clusters. Since the feature cluster A in the current frame F2 is relabeled as "1", the feature cluster B in the current frame F2 is relabeled as "2".

In the frame F3, the entire beacon light sources A and B are captured as the feature clusters A and B, respectively, and a portion of the beacon light source C is captured as a feature cluster C. As the pixels of the frame F3 are processed, the feature clusters A, B and C are provisionally labeled as "3", "1" and "2", respectively. However, since the feature cluster A in the current frame F3 is nearest to the feature cluster A in the previous frame F2, the feature cluster A in the current frame F3 is relabeled as "1", which is the same identifier of the feature cluster A in the previous frame F2. Similarly, since the feature cluster B in the current frame F3 is nearest to the feature cluster B in the previous frame F2, the feature cluster B in the current frame F3 is relabeled as "2", which is the same identifier of the feature cluster B in the previous frame F2. Since only the identifier "3" is left, the feature cluster C in the current frame F3 is relabeled as "3".

In the frame F4, the entire beacon light sources A, B and C are captured as the feature clusters A, B and C, respectively, and a portion of the beacon light source D is captured as a feature cluster D. As the pixels of the frame F4 are processed, the feature clusters A, B, C and D are provisionally labeled as "4", "1", "3" and "2", respectively. However, since the feature cluster A in the current frame F4 is nearest to the feature cluster A in the previous frame F3, the feature cluster A in the current frame F4 is relabeled as "1", which is the same identifier of the feature cluster A in the previous frame F3. Similarly, since the feature cluster B in the current frame F4 is nearest to the feature cluster B in the previous frame F3, the feature cluster B in the current frame F4 is relabeled as "2", which is the same identifier of the feature cluster B in the previous frame F3. Similarly, since the feature cluster C in the current frame F4 is nearest to the feature cluster C in the previous frame F3, the feature cluster C in the current frame F4 is relabeled as "3", which is the same identifier of the feature cluster B in the previous frame F2. Since only the identifier "4" is left, the feature cluster D in the current frame F3 is relabeled as "4".

The table below shows the provisional identifiers and the final identifiers for the feature clusters A, B, C and D in the frames F1, F2, F3 and F4. The left number is the provisional identifier for a particular feature cluster. The right number is the final identifier for a particular feature cluster.

| Feature cluster | Frame F1 | Frame F2 | Frame F3 | Frame F4 |
| --- | --- | --- | --- | --- |
| A | 1/1 | 2/1 | 3/1 | 4/1 |
| B | N/A | 1/2 | 1/2 | 1/2 |
| C | N/A | N/A | 2/3 | 3/3 |
| D | N/A | N/A | N/A | 2/4 |

The above-described process for relabeling feature clusters in a current image frame using the nearest feature clusters in a previous image frame works well when the displacement between the current and previous image frames is small. However, when the displacement between the current and previous image frames is large, labeling errors may be introduced during relabeling process such that the same feature clusters in the current and previous image frames are relabeled using different identifiers, which will result in navigation errors.

Figure 7:
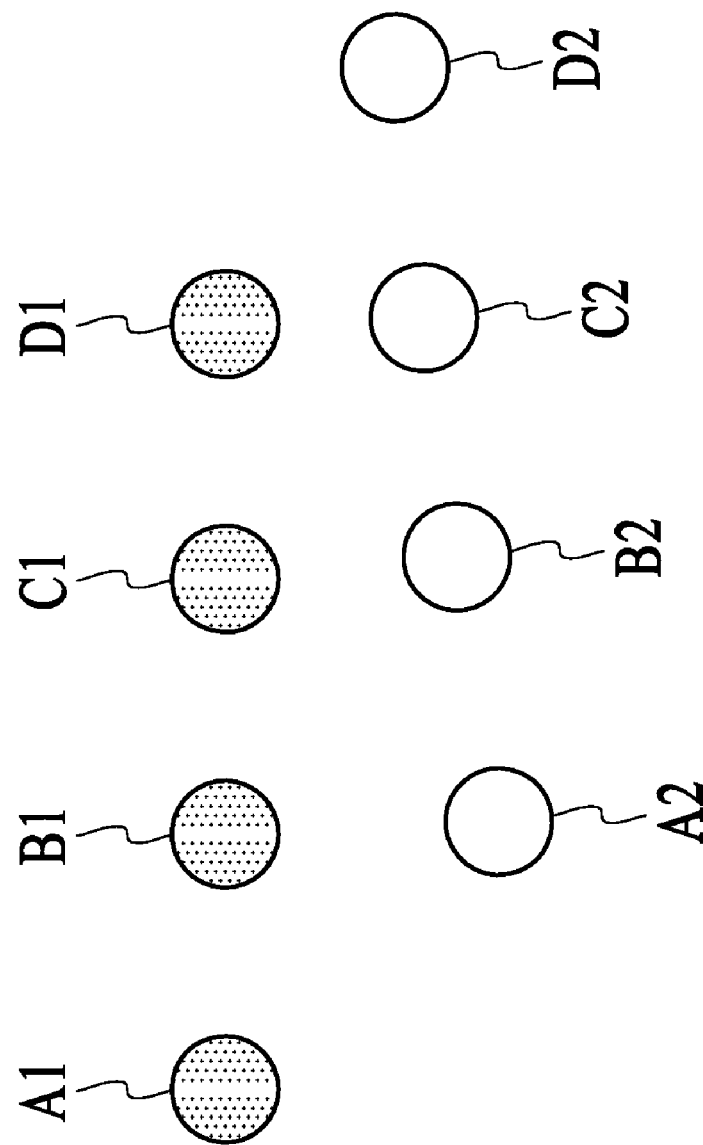
FIG. 7 shows an example of feature clusters in current and previous frames of image data to illustrate relabeling processes in accordance with different embodiments of the invention.

As an example, in FIG. 7, there are eight feature clusters A1, B1, C1, D1, A2, B2, C2 and D2. The feature clusters A1, B1, C1 and D1 represent four distinct feature clusters in a current frame of image data. The feature clusters A2, B2, C2 and D2 represent the same feature clusters in a previous frame of image data. That is, the feature clusters A1, B1, C1 and D1 in the current frame are the same clusters as the feature clusters A2, B2, C2 and D2, respectively, in the previous frame. If the relabeling process using the nearest feature clusters in a previous image frame is used in this example, the feature clusters B1, C1 and D1 in the current frame will be relabeled using the identifiers of the feature clusters A2, B2 and C2, respectively, in the previous frame, and the feature cluster A1 will be relabeled using the identifier of the feature cluster D2. Thus, the feature clusters A1, B1, C1 and D1 in the current frame will be mislabeled with respect to the feature clusters A2, B2, C2 and D2 in the previous frame.

In an alternative embodiment, a feature cluster in the current frame of image data is correlated with the nearest feature cluster in the previous frame of image data by the navigation engine 222 only if the distance between these correlated feature clusters is greater than the distances between other feature clusters in the current frame and their respective nearest feature clusters in the previous frame. The nearest feature cluster may be found by looking at the distances between the centroid of the feature cluster in the current frame of image data and the centroids of the feature clusters in the previous frame of image data to determine the shortest distance. The identifier of the nearest feature cluster in the previous frame of image data is then used as the identifier for the correlated feature cluster in the current frame of image data. Once a particular feature cluster in the previous frame has been used as the nearest feature cluster for a particular feature cluster in the current frame, those particular feature clusters are not used to relabel any other feature cluster in the current frame. In this fashion, each feature cluster in the current frame of image data can be correlated with the correct feature cluster in the previous frame of image data and relabeled using the identifier of that correlated feature cluster.

Figure 8:
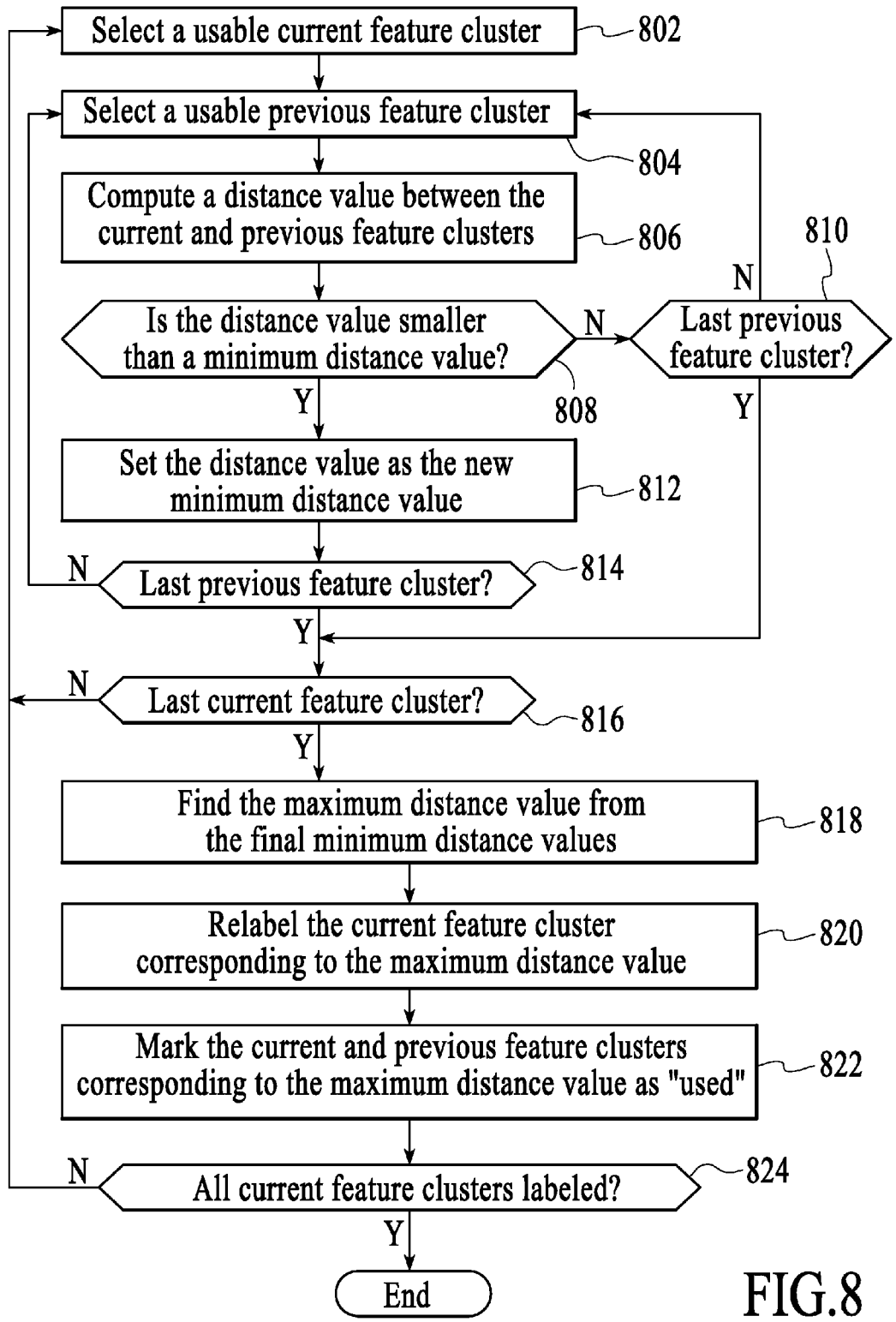
FIG. 8 is a process flow diagram of a relabeling process in accordance with an alternative embodiment of the invention.

This second process of relabeling feature clusters in a current frame of image data in accordance with the alternative embodiment of the invention is further described with reference to a process flow diagram of FIG. 8. The relabeling process begins at block 802, where a useable current feature cluster in the current frame is selected. As used herein, a useable feature cluster is a feature cluster that is available for use in the relabeling process. In an embodiment, the selection of a useable current feature cluster may involve using the feature cluster in the current frame with the lowest provisional numeral identifier. In other embodiments, the selection may involve using one or more other criteria, such as other predefined sequences, which may include a random sequence.

Next, at block 804, a useable previous feature cluster in the previous frame of image data is selected. In an embodiment, the selection of a useable previous feature cluster may involve using the feature cluster in the previous frame with the lowest numeral identifier. In other embodiments, the selection may involve using one or more other criteria, such as other predefined sequences, which may include a random sequence.

Next, at block 806, a value for the distance between the selected current feature cluster and the selected previous feature cluster is computed. In an embodiment, the computed distance value is the distance value between the centroid of the selected current feature cluster and the centroid of the selected previous feature cluster.

Next, at block 808, a determination is made whether the computed distance value is smaller than a minimum distance value. Initially, the minimum distance value may be a default value. If the computed distance value is smaller than the minimum distance value, the process proceeds to block 812. However, if the computed distance value is not smaller than the minimum distance value, the process proceeds to block 810.

At block 810, a determination is made whether the selected previous feature cluster is the last useable previous feature cluster. If no, then the process proceeds back to block 804. If yes, then the process proceeds to block 816.

At block 812, the computed distance value is set as the new minimum distance value. Thus, the previous feature cluster corresponding to this computed distance value is now the current nearest previous feature cluster for the selected current feature cluster.

Next, at block 814, a determination is made whether the selected previous feature cluster is the last useable previous feature cluster. If no, then the process proceeds back to block 804. If yes, then the process proceeds to block 816.

At block 816, a determination is made whether the selected current feature cluster is the last useable current feature cluster. If no, then the process proceeds back to block 802. If yes, then the process proceeds to block 818.

At block 818, the maximum distance value is found from the final minimum distance values for the different current feature clusters. Each minimum distance value corresponds to an associated pair of a particular useable current feature cluster and a particular useable previous feature cluster, which are nearest to each other in the current and previous frames.

Next, at block 820, the current feature cluster corresponding to the maximum distance value is relabeled using the identifier of the previous feature cluster corresponding to the maximum distance value.

Next, at block 822, the current and previous feature clusters corresponding to the maximum distance value are marked as "used". Thus, these feature clusters are no longer available for use in the relabeling process.

Next, at block 824, a determination is made whether all the current feature clusters in the current frame have been relabeled. If no, then the process proceeds back to block 802, where another feature cluster in the current frame is selected to be processed. If yes, then the process comes to an end.

This second relabeling process is illustrated using the feature clusters A1, B1, C1, D1, A2, B2, C2 and D2 in FIG. 7 as an example. Initially, each of the feature clusters A1, B1, C1 and D1 in the current frame is associated with the nearest feature cluster in the previous frame by looking for the minimum distance between each of the feature clusters A1, B1, C1 and D1 and each of the feature clusters A2, B2, C2 and D2. As a result, the feature clusters A1, B1, C1 and D1 in the current frame are associated with the feature clusters A2, A2, B2 and C2, respectively, in the previous current frame. Since the distance between the feature clusters A1 and A2 is the largest distance from the distances between the features clusters A1 and A2, the feature clusters B1 and A2, the feature clusters C1 and B2, and the feature clusters D1 and C2, the feature cluster A1 is relabeled with the identifier of the feature cluster A2. The feature clusters A1 and A2 are then marked as "used". This process is then repeated for the remaining useable feature clusters B1, C1, D1, B2, C2 and D2. As a result, the feature cluster B1 is relabeled with the identifier of the feature cluster B2. The same process is then repeated for the remaining useable feature clusters C1, D1, C2 and D2. As a result, the feature cluster C1 is relabeled with the identifier of the feature cluster C2. The same process is then repeated for the remaining useable feature clusters D1 and D2. As a result, the feature cluster D1 is relabeled with the identifier of the feature cluster D2.

In the above relabeling process, pairs of associated current and previous feature clusters are found by selecting a current feature cluster and then looking at distances between the selected current feature cluster and all the previous feature clusters. However, in other embodiments, pairs of associated current and previous feature clusters can be found by selecting a previous feature cluster and then looking at distances between the selected previous feature cluster and all the current feature clusters.

In some embodiments, the navigation engine 222 may execute either the first relabeling process or the second relabeling process. However, in other embodiments, the navigation engine 222 may switch between the first relabeling process and second relabeling process, either manually or automatically based on one or more predefined parameters. As an example, the second relabeling process in accordance with the alternative embodiment may be used when the controller unit is being moved at a fast rate of speed.

Figure 9:
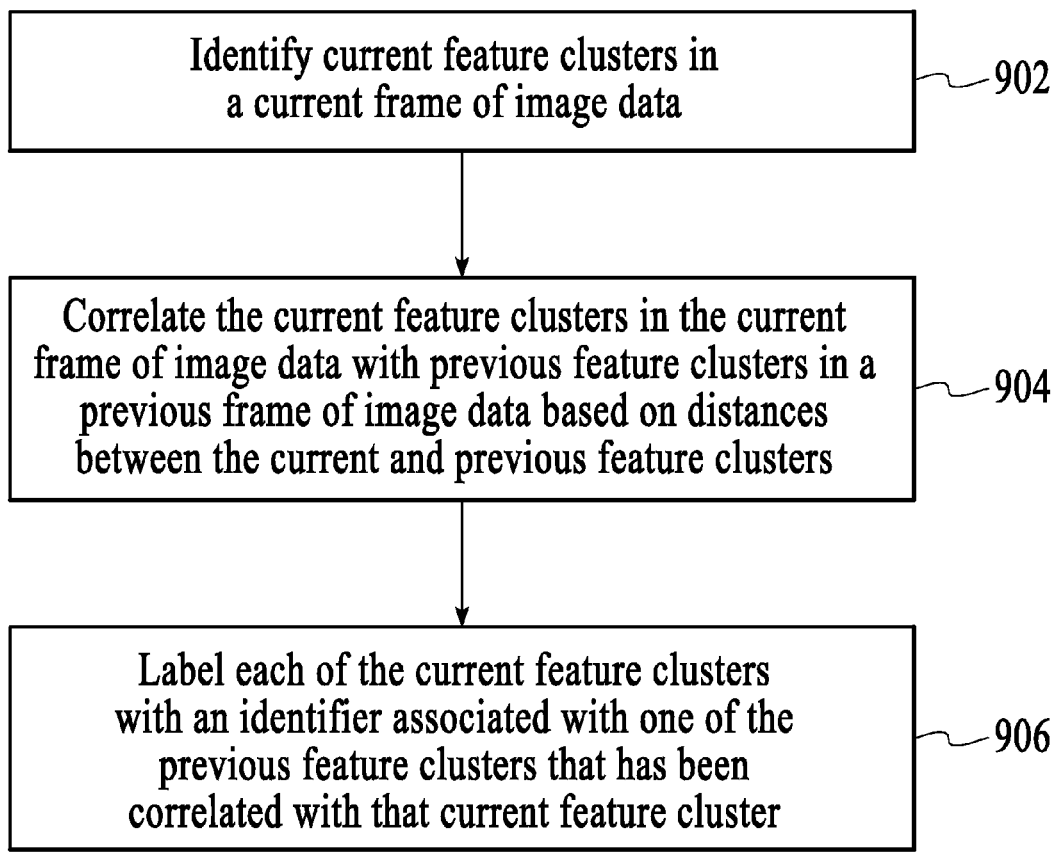
FIG. 9 is a process flow diagram of a method for labeling cluster pixels in frames of image data for optical navigation in accordance with an embodiment of the invention.

A method for labeling feature clusters in frames of image data for optical navigation in accordance with an embodiment of the invention is described with reference to a process flow diagram of FIG. 9. At block 902, current feature clusters in a current frame of image data are identified. Next, at block 904, the current feature clusters in the current frame of image data are correlated with previous feature clusters in a previous frame of image data based on distances between the current and previous feature clusters. Next, at block 906, each of the current feature clusters is labeled with an identifier associated with one of the previous feature clusters that has been correlated with that current feature cluster.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for labeling feature clusters in frames of image data for optical navigation, said method comprising:
   electronically capturing beacon light sources in said frames of image data as said feature clusters using an image sensor with an electronic imaging sensor array of an optical navigation system, said frames of image data including a current frame of image data and a previous frame of image data that are captured at different times;
   identifying current feature clusters in said current frame of image data;
   correlating said current feature clusters in said current frame of image data with previous feature clusters in said previous frame of image data based on distances between said current and previous feature clusters such that a current feature cluster in said current frame of image data and a previous feature cluster in said previous frame of image data that both correspond to the same beacon light source are correlated with each other; and
   labeling each of said current feature clusters with an identifier associated with one of said previous feature clusters that has been correlated with that current feature cluster,
   wherein at least one of said identifying, said correlating and said labeling is performed by a navigation engine in one of an integrated circuit and a processor of said optical navigation system.

2. The method of claim 1 further comprising computing centroids of said current feature clusters in said current frame of image data, said distances between said current feature clusters and said previous feature clusters being distances between said centroids of said current feature clusters and centroids of said previous feature clusters.

3. The method of claim 1 wherein said identifying includes assigning provisional identifiers for said current feature clusters and wherein said labeling includes replacing a provisional identifier of each of said current feature clusters with said identifier associated with one of said previous feature clusters that has been correlated with that current feature cluster.

4. The method of claim 1 wherein said correlating includes correlating a particular current feature cluster of said current feature clusters with a particular previous feature cluster of said previous feature clusters based on a distance between said particular current and previous feature clusters, said distance between said particular current and previous feature clusters being the shortest distance between any of said current feature clusters and any of said previous feature clusters.

5. The method of claim 4 wherein said correlating includes correlating another current feature cluster of said current feature clusters with another previous feature cluster of said previous feature clusters based on a distance between said another current and previous feature clusters, said distance between said another current and previous feature clusters being the shortest distance between any of said current feature clusters and any of said previous feature clusters excluding said distance between said particular current and previous feature clusters.

6. The method of claim 1 wherein said correlating includes associating one of said current feature clusters with one of said previous feature clusters based on a distance between said one of said current feature clusters and said one of said previous feature clusters, said distance between said one of said current feature clusters and said one of said previous feature clusters being the shortest distance between said one of said current feature clusters and any of said previous feature clusters or between said one of said previous feature clusters and any of said current feature clusters.

7. The method of claim 6 wherein said correlating includes correlating a particular current feature cluster of said current feature clusters with an associated previous feature cluster of said previous feature clusters in which a distance between said particular current feature cluster and said associated previous feature clusters is the longest distance between any associated current and previous feature clusters.

8. The method of claim 7 further comprising marking said particular current feature cluster and said associated previous feature cluster as used so that said particular current feature cluster and said associated previous feature cluster are not considered when correlating another feature cluster of said current feature clusters with another feature cluster of said previous feature clusters.

9. A method for labeling feature clusters in frames of image data for optical navigation, said method comprising:
  electronically capturing beacon light sources in said frames of image data as said feature clusters using an image sensor with an electronic imaging sensor array of an optical navigation system, said frames of image data including a current frame of image data and a previous frame of image data that are captured at different times;
  identifying current feature clusters in said current frame of image data;
  correlating said current feature clusters in said current frame of image data with previous feature clusters in said previous frame of image data based on distances between said current and said previous feature clusters such that a current feature cluster in said current frame of image data and a previous feature cluster in said previous frame of image data that both correspond to the same beacon light source are correlated with each other, including associating each current feature cluster of said current feature clusters with one of said previous feature clusters that is closest to that current feature cluster and correlating a particular current feature cluster of said current feature clusters with an associated previous feature cluster of said previous feature clusters in which a distance between said particular current feature cluster and said associated previous feature cluster is the longest distance between any associated current and previous feature clusters; and
  labeling each of said current feature clusters with an identifier associated with one of said previous feature clusters that has been correlated with that current feature cluster,
  wherein said identifying, said correlating and said labeling are performed by a navigation engine in one of an integrated circuit and a processor of an optical navigation system.

10. The method of claim 9 further comprising marking said particular current feature cluster and said associated previous feature cluster as used so that said particular current feature cluster and said associated previous feature cluster are not considered when correlating another current feature cluster of said current feature clusters with another previous feature cluster of said previous feature clusters.

11. A system for optical navigation, said system comprising:
  an image sensor with an electronic imaging sensor array configured to capture frames of image data, said frames of image data including a current frame of image data and a previous frame of image data that are captured at different times; and
  a navigation engine operatively connected to said image sensor, said navigation engine being configured to identify current feature clusters in said current frame of image data and correlate said current feature clusters in said current frame of image data with previous feature clusters in said previous frame of image data based on distances between said current and previous feature clusters such that a current feature cluster in said current frame of image data and a previous feature cluster in said previous frame of image data that both correspond to the same beacon light source are correlated with each other, said navigation engine being further configured to label each of said current feature clusters with an identifier associated with one of said previous feature clusters that has been correlated with that current feature cluster.

12. The system of claim 11 wherein said navigation engine is further configured to compute centroids of said current feature clusters in said current frame of image data, said distances between said current feature clusters and said previous feature clusters being distances between said centroids of said current feature clusters and centroids of said previous feature clusters.

13. The system of claim 11 wherein said navigation engine is configured to assign provisional identifiers to said current feature clusters and replace a provisional identifier of each of said current feature clusters with said identifier associated with one of said previous feature clusters that has been correlated with that current feature cluster.

14. The system of claim 11 wherein said navigation engine is configured to correlate a particular current feature cluster of said current feature clusters with a particular previous feature cluster of said previous feature clusters based on a distance between said particular current and previous feature clusters, said distance between said particular current and previous feature clusters being the shortest distance between any of said current feature clusters and any of said previous feature clusters.

15. The system of claim 14 wherein said navigation engine is configured to correlate another current feature cluster of said current feature clusters with another previous feature cluster of said previous feature clusters based on a distance between said another current and previous feature clusters, said distance between said another current and previous feature clusters being the shortest distance between any of said current feature clusters and any of said previous feature clusters excluding said distance between said particular current and previous feature clusters.

16. The system of claim 11 wherein said navigation engine is configured to associate one of said current feature clusters with one of said previous feature clusters based on a distance between said one of said current feature clusters and said one of said previous feature clusters, said distance between said one of said current feature clusters and said one of said previous feature clusters being the shortest distance between said one of said current feature clusters and any of said previous feature clusters or between said one of said previous feature clusters and any of said current feature clusters.

17. The system of claim 16 wherein said navigation engine is configured to correlate a particular current feature cluster of said current feature clusters with an associated feature cluster of said previous feature clusters in which a distance between said particular current and previous feature clusters is the longest distance between any associated current and previous feature clusters.

18. The system of claim 17 wherein said navigation engine is further configured to mark said particular current feature cluster and said associated previous feature cluster as used so that said particular current feature cluster and said associated previous feature cluster are not considered when correlating another feature cluster of said current feature clusters with another feature cluster of said previous feature clusters.

19. The system of claim 11 further comprising an optical filter positioned in front of said image sensor to selectively transmit light from beacon light sources to capture said beacon light sources as said current feature clusters in said current frame of image data.

* * * * *